April 7, 1925.
H. F. MADER
MIXER FOR GASOLINE ENGINES
Filed Sept. 6, 1923
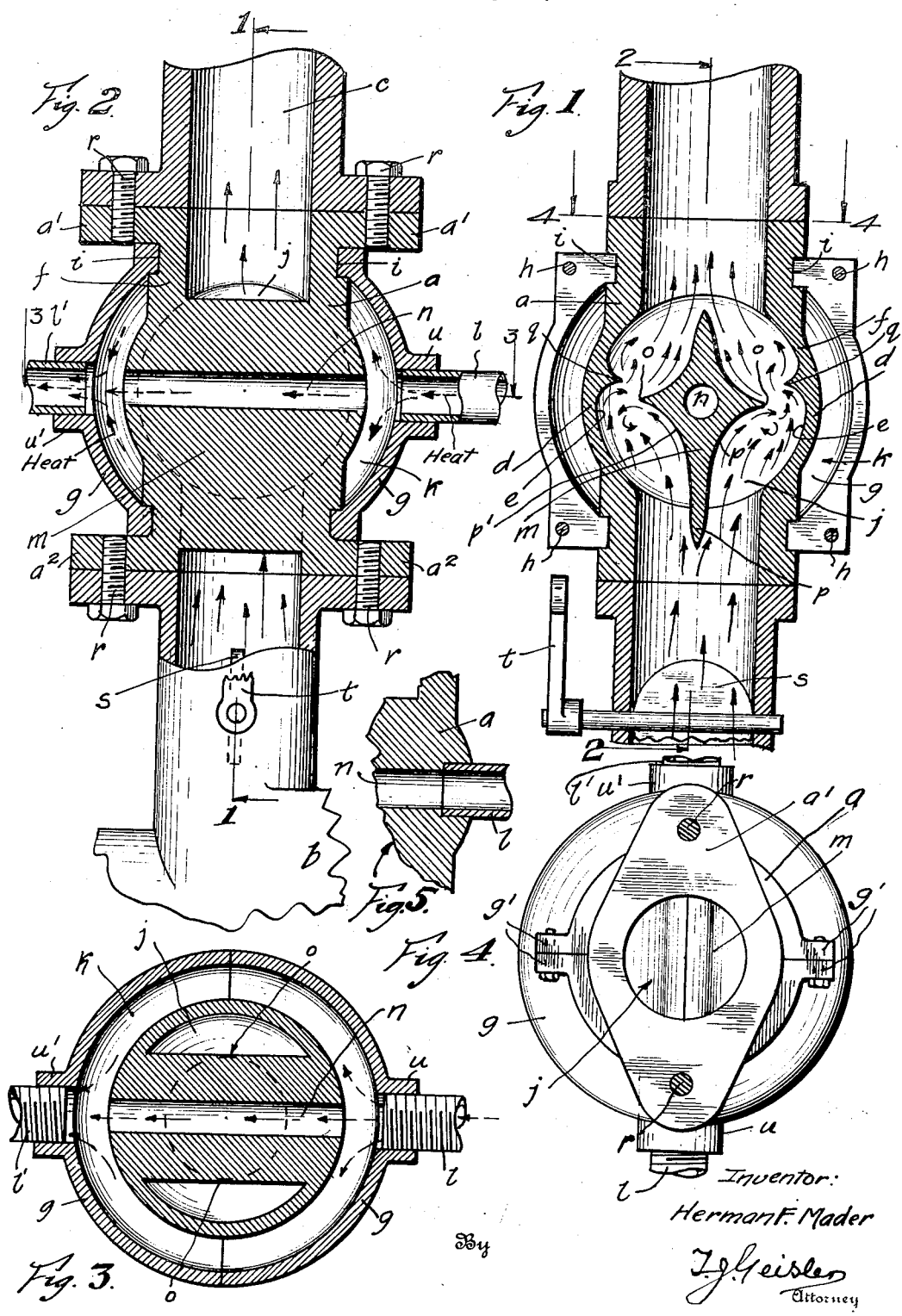
Inventor:
Herman F. Mader Patented Apr. 7, 1925.

1,532,770

UNITED STATES PATENT OFFICE.

HERMAN F. MADER, OF PORTLAND, OREGON.

MIXER FOR GASOLINE ENGINES.

Application filed September 6, 1923. Serial No. 661,295.

*To all whom it may concern:*

Be it known that I, HERMAN F. MADER, a citizen of the United States, and a resident of Portland, county of Multnomah, State of Oregon, have invented a certain new and useful Improvement in Mixers for Gasoline Engines, of which the following is a specification.

My invention relates to device for promoting efficient utilization of fuel in internal combustion engines. Since the carburetor in gasoline engines functions to atomize the gasoline and in that condition intermix it with air, the conversion of the fuel mixture into gasified form had to be accomplished at the instance of ignition by the spark in the cylinder. But experience has taught that the combustion so accomplished frequently is not as complete as it should be in order to give full efficiency. Hence, the trend of modern construction is to provide means for preheating the fuel mixture so as to vaporize it preceding its introduction into the cylinder for ignition.

The object of my invention is to provide inexpensive efficient means, which have no moving parts, by which such preheating is accomplished, such means functioning to heat the introduced fuel mixture during the passage from the carburetor to the intake manifold by heating a portion of the wall of the conduit through which the mixture passes to a relatively higher temperature. At the same time means are provided within the conduit which break up the particles of the mixture into smaller particles and also direct them against the sides of the conduit which heat the same during their time of impact, thus my invention involves two actions, the breaking up and intermixing of the fuel mixture, and at the time of this breaking up subject it to heat, which will further divide the fuel into smaller particles, so that the same will be vaporized or gasified.

The means by which I attain my object may be stated in a general way, as comprising a conduit section interposed between the carburetor and the intake manifold of a gasoline engine, such conduit section having an enlargement at its middle consisting of inner and outer walls, the space enclosed by the inner wall being connected with the carburetor and the intake manifold respectively and the space between the inner and outer walls being connected to a source of heat.

I also provide a partition located in said enlargement extending centrally and longitudinally therein. The partition is enlarged laterally approximately at the middle of the conduit section, one end of said partition projecting into the inlet end of said conduit section and such end of said partition presenting equilateral parabolic surfaces which divert the stream of fuel mixtures so that it will impact upon the encompassing side walls of said enlargement. I also provide lateral projections on the wall portions of said enlargement which are located slightly beyond the projections of the partitions which tends to direct the air towards the partition, the cross sectional area of the passageway between said projections of the partitions and the wall of said enlargement being approximately equal to that of the ends of said conduit and the cross sectional area of the relative space of said enlargement being greater than that of said ends.

The details of construction and the operation of my invention are hereinafter fully described with reference to the accompanying drawings, in which:

Fig. 1, is a longitudinal section through my conduit section and the adjacent sections of conduit, the arrows in this figure showing the approximate direction of fuel gases passing therethrough.

Fig. 2 is a longitudinal section taken on a line of 2—2 of Fig. 1 and is a section taken in a plane normal to the one on which Fig. 1 was taken, the arrows show the approximate path of the heat between the inner and outer shells of the conduit section;

Fig. 3 is a transverse section taken on the line 3—3 of Fig. 2, the arrows in this section show the direction of the heat passing between the inner and outer walls; and Fig. 4 is a view taken on a line 4—4 of Fig. 1 and is an end view looking downwardly at one end of my conduit section.

Fig. 5 is a fragmentary sectional view showing a slightly different type of construction.

My improved conduit section *a* is adapted to be interposed between the carburetor *b* and the intake manifold *c* of an internal combustion engine. The conduit section is made with an enlarged cross section at its middle, as at $d$, and the wall portions, as at $e$, are curved outwardly so as to direct the flow of the fuel mixture in that direction. The conduit section is made with an inner wall $f$ and an outer wall $g$. The outer wall is preferably made in halves which are held together by bolts $h$ which are fastened through the flanges $g'$. The halves of this outer shell $g$ seats at each end in circumferential grooves $i$ in the inner wall $f$.

The space $j$ enclosed by the inner wall $f$ is connected with the conduits $b$ and $c$ and thus provides a passageway for the fuel mixture. Space $k$ between the outer shells is connected with a source of heat which is conducted into this space by a pipe $l$ and leaves through a pipe $l'$. The pipe $l$ is preferably tapped into the exhaust pipe of the motor and thus the heated gases from the motor are exhausted through this pipe and around the inner shell $f$, so that their heat content will be utilized to gasify the fuel mixture introduced into the engine without coming in direct contact with the same.

I provide a partition $m$ which is hollow and has a chamber $n$ therein, which is connected with the space $k$. The partition enlarges laterally approximately to the middle of said enlargement of the conduit section, its broadest point is $o$ and one end, as $p$, presents equilateral parabolic surfaces $p'$, which divert the stream of fuel mixture so that it will impact upon the inner surfaces of the encompassing wall portion $f$ of said enlargement.

The inner surface of the wall portion $f$ has a lateral projection $q$ which is slightly beyond the projection $o$ of the partition which serves to direct the fuel gases back towards the partition $p$ so that the gases will be caused to impact again on this heated central partition.

The cross sectional area of the passageway between the projections $o$ of the partition $m$ and the wall $f$ of said enlargement is approximately equal to that of the ends of said conduit, thus results in no substantial increase in resistance to flow, of the fuel mixture being drawn in the cylinder. The remaining space of said enlargement, being greater in cross section than that of said ends, presents a lesser amount of resistance friction to the flow of said gases.

My conduit section $a$ is provided with elongated flanges $a'$ and $a^2$ which attach to the similar flanges on the intake manifold $c$ and on the carburetor $b$. These flanges are held together by cap screws $r$.

The carburetor is provided with a butterfly valve $s$ as is common in all carburetors, to control the amount of fuel mixture which is to be passed to the engine, and this butterfly valve is controlled by a crank arm $t$ which is rotated by any appropriate mechanism.

The operation of my device is as follows: Air and fuel in fixed volume are admitted into the intake manifold by the carburetor. Said intake manifold and said carburetor are normally fastened together and I spread these two parts apart and insert my conduit section between them. I preferably tap into the exhaust pipe and connect thereto a section of pipe which taps also into the boss $u$ on the outer wall $g$ and which supplies heat for my conduit section. The outlet pipe for this heated air is seated in a similar boss $u'$ on the opposite side of the conduit section.

The fuel mixture as it leaves the carburetor is mixed in fixed proportions and is drawn from the carburetor on the suction stroke of the engine. The inner wall $f$ of my improved conduit is heated substantially its entire length and thus as the fuel mixture is drawn through the conduit section it is heated due to the radiation from the wall, and due to the fact that a certain percentage of the fuel mixture comes in direct contact with the wall. To increase this contact with the wall I provide a longitudinal partition, the inlet end of which presents equilateral parabolic surfaces which divert the stream of fuel mixture so that it will impact upon the encompassing wall of the enlargement.

This partition, also, is heated and as the stream of fuel strikes it, the fuel is subjected to heat and thus this impact causes a certain percentage of fuel mixture to be vaporized or gasified. The fuel mixture is directed away from this partition, because of the curved parabolic surface and against the side walls of the conduit section. The walls also being heated causes a further portion to be vaporized or gasified and the lateral projections $q$ tends not only to cause the gases to swirl about in the conduit section but directs a certain portion of the fuel mixture back against the partition where it is again subjected to heat and therefore caused to vaporize still more. It can, therefore, be seen that my improved device not only causes the fuel mixture to be subjected to heat but causes its more thorough intermixture and also breaks up the particles so that they are more easily combustible.

The providing of the outer heating jacket $g$ is optional and if omitted the heating pipes $l$ and $l'$ would be connected with the duct $n$, as shown by Fig. 5. It is also apparent that my invention may be made either in the form of an attachment to the engine of an automobile, or it may be built into the engine or carburetor itself.

I claim:

1. In a gasoline engine, a conduit-section interposed between the intake manifold, such conduit being made with an enlarged cross section at its middle, a partition located in said enlargement, extending centrally and longitudinally therein, said partition enlarging laterally approximately at the middle of said enlargement of the conduit section, one end of said partition projecting into the inlet end of said conduit section such end of said partition presenting equilateral parabolic surfaces thereby to divert the stream of fuel mixture so as to impact upon the encompassing wall portion of said enlargement.

2. In a gasoline engine, a conduit-section interposed between the carburetor and the intake manifold, such conduit being made with an enlarged cross section at its middle, a partition located in said enlargement, extending centrally and longitudinally therein, said partition enlarging laterally approximately at the middle of said enlargement of the conduit section, one end of said partition projecting into the inlet end of said conduit section such end of said partition presenting equilateral parabolic surfaces thereby to divert the stream of fuel mixture so as to impact upon the encompassing wall portion of said enlargement, the wall portions of said enlargement having lateral projections located slightly beyond said projections of the partition, the cross-sectional area of the passageway between said projections of the partition and the wall of said enlargement being approximately equal to that of the ends of said conduit, and the cross-sectional area of the remaining space of said enlargement being greater than that of said ends.

3. A conduit-section adapted to be interposed between the carburetor and the intake manifold of a gasoline engine, such conduit being made with an enlarged cross section at its middle and the wall portions about such enlargement being curved so as to direct the flow of the fuel mixture, a chambered partition located in said enlargement, extending centrally and longitudinally therein, means for connecting said chamber to a source of heat, said partition enlarging laterally approximately at the middle of said enlargement of the conduit section, one end of said partition projecting into the inlet end of said conduit section, such end of said partition presenting equilateral parabolic surfaces thereby to divert the stream of fuel mixture so as to impact upon the encompassing wall portion of said enlargement.

4. A conduit-section adapted to be interposed between the carburetor and the intake manifold of a gasoline engine, such conduit being made with an enlarged cross section at its middle and the wall portions about such enlargement being curved so as to direct the flow of the fuel mixture, a chambered partition located in said enlargement, extending centrally and longitudinally therein, means for connecting said chamber to a source of heat, said partition enlarging laterally approximately at the middle of said enlargement of the conduit section, one end of said partition projecting into the inlet end of said conduit section both ends of said partition presenting equilateral parabolic surfaces thereby to divert the stream of fuel mixture so as to impact upon the encompassing wall portion of said enlargement.

5. A conduit-section adapted to be interposed between the carburetor and the intake manifold of a gasoline engine, such conduit being made with an enlarged cross section at its middle a partition located in said enlargement, extending centrally and longitudinally therein, said partition enlarging laterally approximately at the middle of said enlargement of the conduit section, one end of said partition projecting into the inlet end of said conduit section such end of said partition presenting equilateral parabolic surfaces thereby to divert, the stream of fuel mixture so as to impact upon the encompassing wall portion of said enlargement, the wall portions of said enlargement having lateral projections located slightly beyond said projections of the partition, the cross-sectional area of the passageway between said projections of the partition and the wall of said enlargement being approximately equal to that of the ends of said conduit, and the cross-sectional area of the remaining space of said enlargement being greater than that of said ends.

HERMAN F. MADER.